(12) United States Patent
Itou et al.

(10) Patent No.: US 10,410,764 B2
(45) Date of Patent: Sep. 10, 2019

(54) WATERPROOF WIRE HARNESS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Kenji Itou, Yokkaichi (JP); Takashi Takada, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/094,668

(22) PCT Filed: Apr. 11, 2017

(86) PCT No.: PCT/JP2017/014803
§ 371 (c)(1),
(2) Date: Oct. 18, 2018

(87) PCT Pub. No.: WO2017/187963
PCT Pub. Date: Nov. 2, 2017

(65) Prior Publication Data
US 2019/0131033 A1    May 2, 2019

(30) Foreign Application Priority Data
Apr. 27, 2016    (JP) .................................. 2016-089678

(51) Int. Cl.
*H01B 7/00* (2006.01)
*H01B 7/285* (2006.01)
(Continued)

(52) U.S. Cl.
CPC ......... *H01B 7/2825* (2013.01); *H01B 7/0045* (2013.01); *H01B 7/285* (2013.01);
(Continued)

(58) Field of Classification Search
CPC ...... H01B 7/2825; H01B 7/0045; H01R 4/72; H01R 4/029; H01R 4/18; H02G 15/24
(Continued)

(56) References Cited

U.S. PATENT DOCUMENTS 4,822,434 A * 4/1989 Sawaki ............... B29C 35/0888
156/275.5
4,863,535 A * 9/1989 More ....................... H01R 4/70
156/49

(Continued)

FOREIGN PATENT DOCUMENTS

JP    2012-248527 A    12/2012
JP    2013-004411 A    1/2013
(Continued)

OTHER PUBLICATIONS

May 16, 2017 International Search Report issued in International Patent Application No. PCT/JP2017/014803.

*Primary Examiner* — Andargie M Aychillhum
*Assistant Examiner* — Michael F McAllister
(74) *Attorney, Agent, or Firm* — Oliff PLC

(57) ABSTRACT

A wire harness can ensure waterproofness of an exposed conductor portion, and even when at least one of insulated wires is exposed to a high temperature, can suppress loosening of a rubber stopper of a waterproofing terminal. An outer periphery of a region containing an exposed conductor
(Continued)

portion and coating material end portions is continuously covered with a protective film. At each of the coating material end portions, a gap between a coating material and the protective film covering the coating material is sealed with a waterproofing agent. At least one insulated wire has a flow path through which gas flows, the flow path being created in gaps between strands that constitute a conductor of the insulated wire and reaching from a coating material end portion opposite to the coating material end portion adjacent to the exposed conductor portion to a splice portion.

6 Claims, 5 Drawing Sheets

(51) Int. Cl.
*H01R 4/70* (2006.01)
*H01R 4/72* (2006.01)
*H02G 15/18* (2006.01)
*H02G 15/24* (2006.01)
*H01R 4/18* (2006.01)
*H01B 7/282* (2006.01)
*H01R 13/52* (2006.01)
*H01R 4/02* (2006.01)

(52) U.S. Cl.
CPC ........... *H01R 4/72* (2013.01); *H01R 13/5216* (2013.01); *H02G 15/18* (2013.01); *H02G 15/24* (2013.01); *H01R 4/029* (2013.01); *H01R 4/18* (2013.01); *H01R 13/5205* (2013.01); *Y02A 30/14* (2018.01)

(58) Field of Classification Search
USPC ...................................................... 174/21 R
See application file for complete search history.

(56) References Cited

U.S. PATENT DOCUMENTS

| | | | | |
|---|---|---|---|---|
| 5,099,088 A | * | 3/1992 | Usami | H01R 4/22 |
| | | | | 156/49 |
| 5,399,810 A | * | 3/1995 | Hayami | H01R 4/70 |
| | | | | 156/49 |
| 6,303,865 B1 | * | 10/2001 | Yamamoto | H01R 4/70 |
| | | | | 174/17.08 |
| 7,572,979 B2 | * | 8/2009 | Otsuki | H01R 13/5213 |
| | | | | 174/84 R |
| 8,740,223 B1 | * | 6/2014 | Alpi | H02G 3/0481 |
| | | | | 277/312 |
| 2012/0318576 A1 | | 12/2012 | Koto | |
| 2014/0299353 A1 | * | 10/2014 | Saito | H01B 7/282 |
| | | | | 174/113 R |
| 2015/0096786 A1 | * | 4/2015 | Takasu | B32B 7/02 |
| | | | | 174/145 |

FOREIGN PATENT DOCUMENTS

| | | |
|---|---|---|
| JP | 5418457 B2 | 2/2014 |
| JP | 2015-159070 A | 9/2015 |

* cited by examiner

WATERPROOF WIRE HARNESS

TECHNICAL FIELD

The present disclosure relates to a wire harness, and more particularly relates to a wire harness in which an exposed conductor portion including a splice portion of insulated wires is waterproofed.

BACKGROUND ART

In an in-vehicle wire harness, for example, there are cases where conductors of insulated wires are partially exposed at intermediate portions or the like of the insulated wires, and the exposed conductors are joined together to form a splice portion. An exposed conductor portion including the thus formed splice portion is covered and protected with a resin material.

CITATION LIST

Patent Documents

Patent Document 1: Japanese Patent No. 5418457

SUMMARY

Technical Problem

When the exposed conductor portion formed of a bundle of exposed conductors including the splice portion is covered with a resin material, the resin material penetrates into gaps between strands constituting these conductors. When the resin material completely penetrates into the gaps between the strands, the intrusion of water into the exposed conductor portion from a connecting terminal side via the inside of coating materials of the conductors can also be prevented. Thus, the waterproofing effect is increased even more. Therefore, in view of the waterproofing effect, usually, the resin material is allowed to fully penetrate into the gaps between the strands constituting the conductors. However, as a result of the gaps between the strands that constitute the conductors being filled with the resin material, air inside the coating materials is cut off from escaping to the exposed conductor portion. If at least one of the insulated wires included in such a wire harness is exposed to a high temperature, the air inside the coating material expands. Due to being cut off from escaping to the exposed conductor portion, the expanded air moves toward the connecting terminal opposite to the exposed conductor portion, and thus, a rubber stopper of a waterproofing terminal may come off due to pressure applied by the expanded air.

To address the above-described problem, an object of certain aspects of certain preferred embodiments is to provide a wire harness in which waterproofness of the exposed conductor portion can be ensured, and, even when at least one of the insulated wires is exposed to a high temperature, loosening of the rubber stopper of the waterproofing terminal can be suppressed, so that reliable waterproofing can be achieved.

Solution to Problem

To address the above-described problem, a wire harness according to a preferred embodiment is a wire harness including a waterproofing structure for waterproofing an exposed conductor portion including a splice portion where partially exposed conductors of a plurality of insulated wires are joined together, the exposed conductor portion being formed of a bundle of the exposed conductors of the plurality of insulated wires, wherein an outer periphery of a region containing the exposed conductor portion and coating material end portions adjacent to the exposed conductor portion, of the insulated wires is continuously covered with a film-like or tubular protective material, and, at each of the coating material end portions, a gap between a coating material and the protective material covering the coating material is sealed with a waterproofing agent, and at least one insulated wire of the plurality of insulated wires has a flow path through which gas flows, the flow path being created in gaps between strands that constitute the conductor of the insulated wire and reaching from a coating material end portion opposite to the coating material end portion adjacent to the exposed conductor portion to the splice portion.

It is preferable that the exposed conductor portion is partially provided with a portion where the waterproofing agent is not disposed between the exposed conductor portion and the protective material covering the exposed conductor portion.

It is preferable that at least one insulated wire of the plurality of insulated wires is an insulated wire whose conductor partially exposed at an intermediate portion of the wire in its longitudinal direction is joined to the exposed conductor of another insulated wire in the splice portion, and the insulated wire has a flow path through which gas flows, the flow path being created in gaps between strands that constitute the conductor and reaching from one end to another end of the wire in the longitudinal direction.

It is preferable that two or more insulated wires of the plurality of insulated wires each have a flow path through which gas flows, the flow path being created in gaps between strands that constitute the conductor of the insulated wire and reaching from a coating material end portion opposite to the coating material end portion adjacent to the exposed conductor portion to the splice portion.

It is preferable that the waterproofing agent is formed of a cured product of a curable resin.

Effects

With the wire harness according to the preferred embodiment, the outer periphery of the region containing the exposed conductor portion and the coating material end portions adjacent to the exposed conductor portion, of the insulated wires is continuously covered with the film-like or tubular protective material, and, at each of the coating material end portions, the gap between the coating material and the protective material covering the coating material is sealed with the waterproofing agent. Thus, the intrusion of water into the exposed conductor portion from the gaps between the protective material and the individual coating materials and from outside the protective material can be suppressed, so that waterproofing properties are ensured. Moreover, at least one insulated wire of the plurality of insulated wires has a flow path through which gas flows, the flow path being created in the gaps between the strands that constitute the conductor and reaching from the coating material end portion opposite to the coating material end portion adjacent to the exposed conductor portion to the splice portion. Thus, air inside the coating material of this insulated wire has an escape route to the exposed conductor portion. Accordingly, even when this insulated wire is exposed to a high temperature, the air inside the coating material flows to the exposed conductor portion, and loosening of a waterproofing rubber stopper due to pressure applied by expanded air moving toward a connecting terminal opposite to the exposed conductor portion can be suppressed.

At this time, when at least one insulated wire of the plurality of insulated wires is an insulated wire whose conductor partially exposed at an intermediate portion of the wire in its longitudinal direction is joined to the exposed conductor of another insulated wire in the splice portion, and the insulated wire has a flow path through which gas flows, the flow path being created in the gaps between the strands that constitute the conductor of the insulated wire and reaching from one end to the other end of the wire in the longitudinal direction, even when the insulated wire is exposed to a high temperature, air inside the coating material flows to a portion of the insulated wire that is not exposed to the high temperature. Thus, loosening of a waterproofing rubber stopper due to pressure applied by expanded air moving toward a connecting terminal opposite to the exposed conductor portion can be suppressed even more.

Furthermore, when two or more insulated wires of the plurality of insulated wires each have a flow path through which gas flows, the flow path being created in the gaps between the strands that constitute the conductor and reaching from the coating material end portion opposite to the coating material end portion adjacent to the exposed conductor portion to the splice portion, even when one of these insulated wires is exposed to a high temperature, air inside the coating material of this insulated wire flows to the inside of the coating material of another insulated wire whose flow path is connected to the flow path of the insulated wire exposed to the high temperature. Thus, loosening of a waterproofing rubber stopper due to pressure applied by expanded air moving toward a connecting terminal of this insulated wire that is opposite to the exposed conductor portion can be suppressed even more.

DESCRIPTION OF EMBODIMENTS

Figure 1:
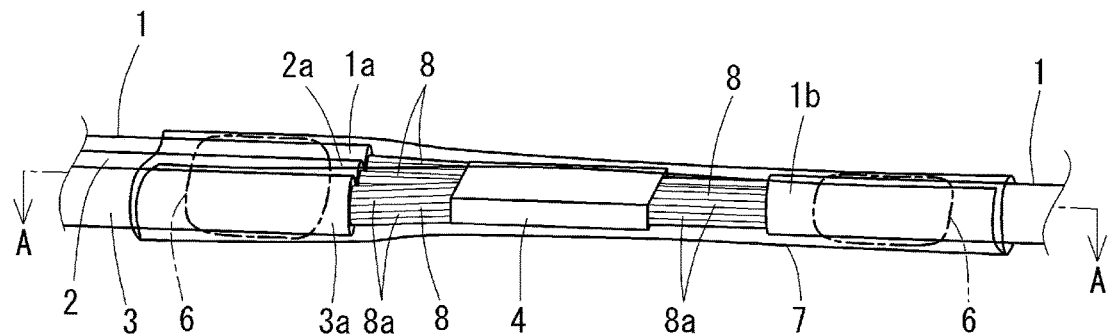
FIG. 1 is a perspective view showing an appearance of an exposed conductor portion including a splice portion, and its neighboring portions, of a wire harness according to an embodiment.
Figure 2:
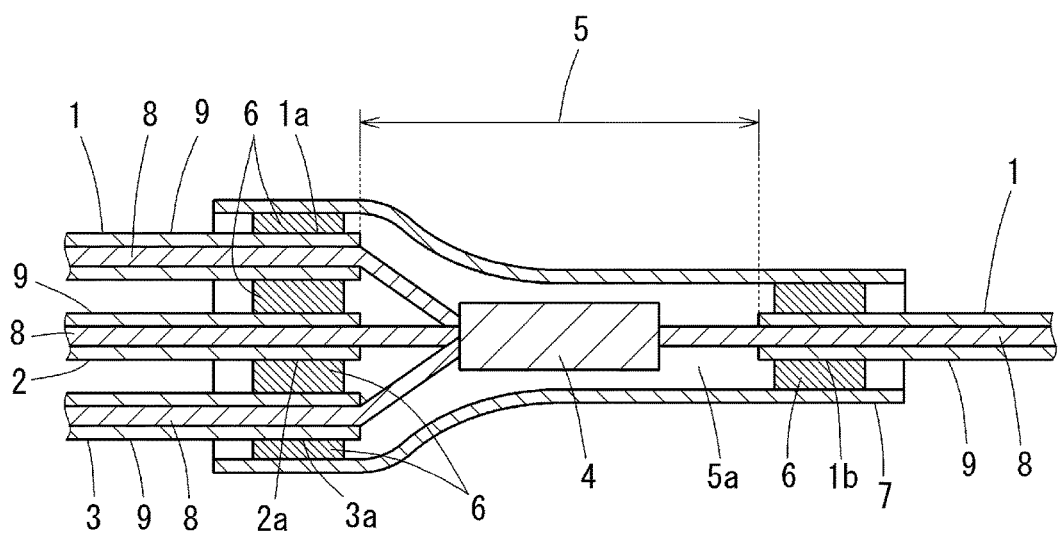
FIG. 2 is a horizontal cross-sectional view taken along line A-A in FIG. 1.

Next, an embodiment will be described in detail. FIG. 1 is a perspective view showing an appearance of an exposed conductor portion including a splice portion, and its neighboring portions, of a wire harness according to an embodiment. FIG. 2 is a horizontal cross-sectional view taken along line A-A in FIG. 1. FIG. 3 shows explanatory diagrams illustrating an example of a method for producing the wire harness in FIG. 1.

A wire harness 10 according to an embodiment includes an insulated wire 1 whose conductor 8 is partially exposed at an intermediate portion of the wire in its longitudinal direction, and insulated wires 2 and 3 whose conductors 8 are partially exposed at an end portion of the respective wires in their longitudinal direction, and has an exposed conductor portion 5 formed of a bundle of the exposed conductors 8 of the plurality of insulated wires 1 to 3 and including a splice portion 4 in which the partially exposed conductors 8 of the plurality of insulated wires 1 to 3 are joined together. Moreover, the wire harness 10 has a waterproofing structure for waterproofing the exposed conductor portion 5. That is to say, the outer periphery of a region including the exposed conductor portion 5 and coating material end portions 1a to 3a and 1b adjacent to the exposed conductor portion 5, of the insulated wires 1 to 3 is continuously covered with a film-like protective material (protective film 7), and, at each of the coating material end portions 1a to 3a and 1b, a gap between a coating material 9 and the protective film 7 covering the coating material 9 is sealed with a waterproofing agent 6. The intrusion of water from outside an outer peripheral surface of the exposed conductor portion 5 can be suppressed by the protective film 7. The intrusion of water from gaps between the protective film 7 and the insulated wires 1 to 3 and gaps between the insulated wires 1 and 2, between the insulated wires 2 and 3, and between the insulated wires 3 and 1 can be suppressed by the waterproofing agent 6.

The conductors 8 of the insulated wires 1 to 3 are each constituted by a bundle of a plurality of strands 8a. The plurality of strands 8a may be twisted together and constitute a twisted wire, or may not be twisted together. The insulated wires 1 to 3 with such a configuration each contain air between the coating material 9 and the conductor 8 and between the strands 8a constituting the conductor 8. That is to say, the insulated wires 1 to 3 each contain air inside the coating material 9. A flow path through which gas flows is created in gaps between the strands 8a constituting the conductor 8, extending through each wire along the longitudinal direction.

Figure 4:
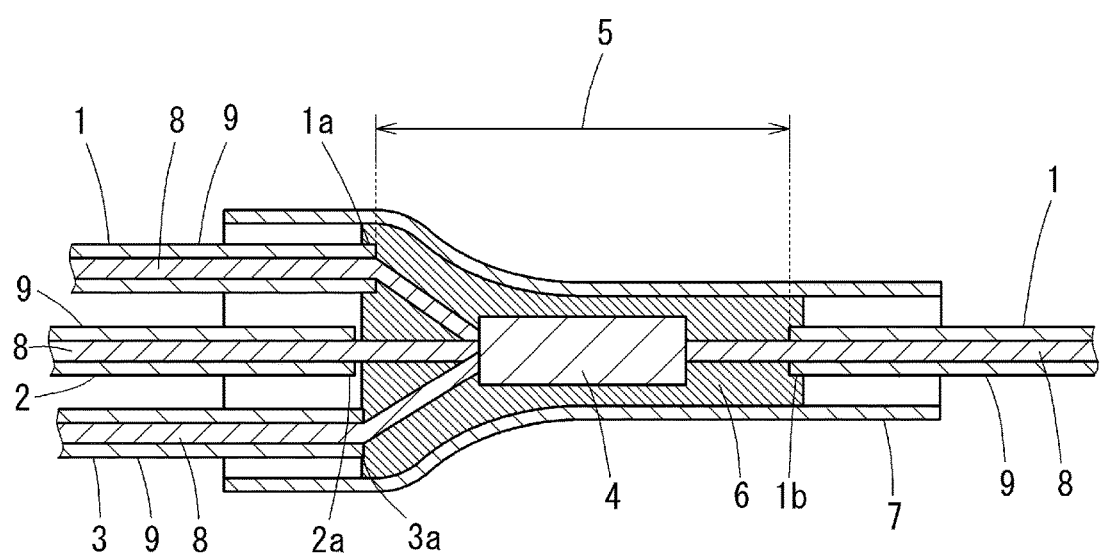
FIG. 4 is a perspective view showing an appearance of an exposed conductor portion including a splice portion, and its neighboring portions, of a wire harness according to another embodiment.

When the exposed conductor portion 5 is waterproofed, if the waterproofing agent 6 is supplied to the exposed conductor portion 5 as shown in FIG. 4, the waterproofing agent 6 penetrates into the gaps between the strands 8a constituting the conductors 8. When the waterproofing agent 6 has completely penetrated into the gaps between the strands 8a, the gaps between the strands 8a constituting the conductors 8 are completely filled with the waterproofing agent 6. In that case, the flow paths, which are created in the gaps between the strands 8a and through which gas flows, are completely blocked. Moreover, when supplying the waterproofing agent 6 to the exposed conductor portion 5, it is not easy to adjust the supply of the waterproofing agent 6 so that the coating material end portions 1a to 3a and 1b are covered with the waterproofing agent 6 and reliably waterproofed. There are cases where the end positions of the coating material end portions 1a to 3a are not aligned because, for example, the amount of coating material 9 removed varies among the insulated wires 1 to 3. For example, if the amount of waterproofing agent 6 supplied to the exposed conductor portion 5 is small, the outer peripheries of the coating material end portions 2a and 3a may not be reliably covered, even though the outer periphery of the coating material end portion 1a can be reliably covered. If the amount of waterproofing agent 6 supplied to the exposed conductor portion 5 is increased, with consideration also given to the variation in the amount of coating material 9 removed, so that the outer peripheries of the individual coating material end portions 1*a* to 3*a* can be reliably covered, the amount of waterproofing agent 6 becomes excessive, resulting in the problem in that the shape becomes distorted or the waterproofing agent 6 protrudes from the protective film 7.

In the preferred embodiment, the waterproofing agent 6 is not supplied to the exposed conductor portion 5, but is supplied to the coating material end portions 1*a* to 3*a* and 1*b* that are adjacent to the exposed conductor portion 5, of the insulated wires 1 to 3. Thus, at the coating material end portions 1*a* to 3*a* and 1*b*, the gap between each of the coating materials 9 and the protective film 7 covering that coating material 9 can be sealed with the waterproofing agent 6, and penetration of the waterproofing agent 6 into the gaps between the strands 8*a* constituting the conductors 8 can be suppressed. The gaps between the strands 8*a* constituting the conductors 8 are not completely filled with the waterproofing agent 6, and flow paths through which gas flows are secured in the gaps between the strands 8*a*. As a result, flow paths through which gas flows are created reaching from coating material end portions opposite to the respective coating material end portions 1*a* to 3*a* and 1*b*, which are adjacent to the exposed conductor portion 5, to the splice portion 4, in the gaps between the strands 8*a* constituting the conductors 8, and air inside each coating material 9 has an escape route to the exposed conductor portion 5. Accordingly, even when the insulated wires 1 to 3 are partially exposed to a high temperature, the air inside the coating materials 9 flows to the exposed conductor portion 5. Thus, loosening of a waterproofing rubber stopper due to pressure applied by expanded air moving toward a connecting terminal opposite to the exposed conductor portion 5 can be suppressed.

In the preferred embodiment, although the waterproofing agent 6 is supplied to the coating material end portions 1*a* to 3*a* and 1*b* adjacent to the exposed conductor portion 5, of the insulated wires 1 to 3, it is not necessary that the waterproofing agent 6 be completely prevented from flowing into (coming into contact with) the exposed conductor portion 5. The waterproofing agent 6 may flow into (come into contact with) the exposed conductor portion 5 as long as the gaps between the strands 8*a* constituting the conductors 8 are not completely filled with the waterproofing agent 6. However, since the waterproofing agent 6 is supplied to the coating material end portions 1*a* to 3*a* and 1*b*, in order to supply an appropriate amount of waterproofing agent 6 so as to not distort the shape of the waterproofing structure, it is preferable that the exposed conductor portion 5 is partially provided with a portion 5*a* where the waterproofing agent 6 is not disposed between the exposed conductor portion 5 and the protective film 7 covering the exposed conductor portion 5. Note that, as long as the gaps between the strands 8*a* constituting the conductors 8 are not completely filled with the waterproofing agent 6, the entire exposed conductor portion 5 may be covered with the waterproofing agent 6.

It is sufficient that a flow path through which gas flows is secured in the gaps between the strands 8*a* of at least one insulated wire that is exposed to a high temperature, of the plurality of insulated wires 1 to 3. However, if flow paths are secured in two or more insulated wires of the plurality of insulated wires 1 to 3, even when one of the insulated wires is exposed to a high temperature, air inside the coating material 9 of this insulated wire flows to the inside of the coating material 9 of another insulated wire whose flow path is connected to the flow path of the insulated wire that is exposed to the high temperature. Thus, loosening of a waterproofing rubber stopper due to pressure applied by expanded air moving toward a connecting terminal opposite to the exposed conductor portion 5 of the insulated wire that is exposed to a high temperature can be suppressed even more.

The insulated wire 1 of the plurality of insulated wires 1 to 3 is an insulated wire whose conductor 8 is partially exposed at an intermediate portion of the wire in the longitudinal direction, and the partially exposed conductor 8 is joined to the exposed conductors 8 of the other insulated wires 2 and 3 in the splice portion 4. In this insulated wire 1, if a flow path through which gas flows is secured in the gaps between the strands 8*a*, the insulated wire 1 has a flow path through which gas flows, the flow path being created in the gaps between the strands 8*a* that constitute the conductor 8 and reaching from one end to the other end of the wire in the longitudinal direction. In this case, even when the insulated wire 1 is partially exposed to a high temperature, air inside the coating material 9 flows to a portion of the insulated wire 1 that is not exposed to the high temperature, and thus, loosening of a waterproofing rubber stopper due to pressure applied by expanded air moving toward a connecting terminal opposite to the exposed conductor portion 5 can be suppressed even more.

There is no limitation on the material for the coating materials 9 of the insulated wires 1 to 3, and an insulating resin material and the like can be used. Examples of the insulating resin material include a vinyl chloride resin and an olefin resin. The insulating resin material may contain an additive that is added to the coating materials. Examples of the additive include a flame retardant and an antioxidant.

The strands 8*a* constituting the conductors 8 are composed of one or two or more selected from metal strands and organic fibers. Copper, a copper alloy, aluminum, an aluminum alloy, and the like that have excellent conductivity are used as the metal strands. Moreover, stainless steel or the like may also be used as a reinforcing wire (tension member). A conductive organic fiber and a non-conductive organic fiber are used as the organic fibers. The conductive organic fiber may be a conductive fiber containing a conductive filler within the fiber or may be a conductive fiber obtained by coating the outer periphery of an organic fiber with a metal layer. The non-conductive organic fiber is suitably used as a reinforcing wire (tension member).

There is no limitation on the waterproofing agent 6, and an insulating resin material and the like that have excellent adhesive properties can be used. Examples of the waterproofing agent 6 include a thermoplastic resin, a thermosetting resin, a photo-curable resin, and a moisture-curable resin. An example of the thermoplastic resin is a polyamide resin. An example of the thermosetting resin is an epoxy resin. An example of the photo-curable resin is an acrylic resin. An example of the moisture-curable resin is a silicone resin.

Preferably, the curable resins have a viscosity of 1.0 Pa·s or greater at room temperature (25° C.), in order to, for example, make it less likely that a curable resin will flow into the exposed conductor portion 5 from the coating material end portions 1*a* to 3*a* and 1*b*. The viscosity of the curable resins at room temperature is more preferably 2.0 Pa·s or greater, and even more preferably 5.0 Pa·s or greater. Moreover, in view of, for example, the ease of penetration into the gaps between the insulated wires 1 and 2, between the insulated wires 2 and 3, and between the insulated wires 3 and 1, the viscosity of the curable resins at room temperature (25° C.) is preferably 20 Pa·s or less, and more preferably 15 Pa·s or less.

The splice portion 4 may be formed using various welding methods such as resistance welding, ultrasonic welding, and laser welding, or may be formed through crimping using a component such as a crimping terminal.

The protective film 7 is wrapped around the outer periphery of the waterproofing agent 6 and is thereby disposed on the outer periphery of the waterproofing agent 6 in a state in which it is in close contact with the waterproofing agent 6. In view of the ease of wrapping the protective film 7, the protective film 7 preferably has excellent flexibility. Therefore, a film made of resin is preferable. Examples of the resin used to form the protective film 7 include polyethylene, polyvinyl chloride, polyvinylidene chloride, polyvinylidene fluoride, polyester, polyethylene terephthalate, and nylon. In view of shape stability, hermetic sealing, and the like of the protective film 7 after being wrapped, the protective film 7 preferably has self-adhesive (pressure-sensitive adhesive) properties. From this view point, a vinyl chloride resin, a vinylidene chloride resin, a vinylidene fluoride resin, and the like are preferable as the resin forming the protective film 7.

In the case where a photo-curable resin is used as the waterproofing agent 6, it is preferable that the protective film 7 has excellent light-transmitting properties. For example, the protective film 7 preferably has an ultraviolet transmissivity of 50% or greater, and more preferably 90% or greater. In order to, for example, ensure excellent flexibility, the protective film 7 preferably has a thickness of 200 μm or less, and more preferably 150 μm or less. On the other hand, in order to, for example, ensure strength, the thickness of the protective film 7 is preferably 5 μm or greater.

Next, a method for producing the wire harness 10 will be described. FIG. 3 illustrates an example of the method for producing the wire harness 10.

Figure 3A:
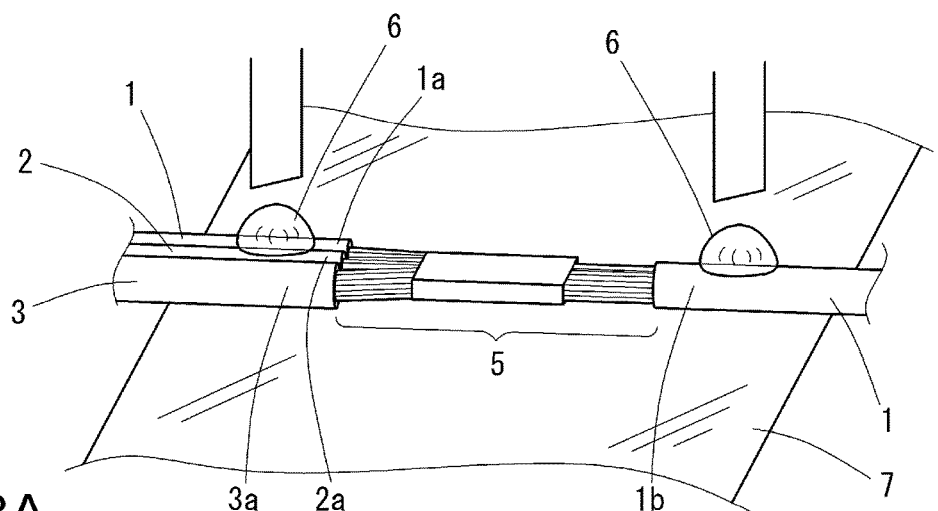
FIG. 3 shows explanatory diagrams illustrating an example of a method for producing the wire harness in FIG. 1.

As shown in FIG. 3(a), first, a wire bundle formed of the plurality of insulated wires 1 to 3 having the exposed conductor portion 5 including the splice portion 4 is prepared. This wire bundle can be formed by partially removing the coating materials 9 of the respective insulated wires 1 to 3 at predetermined positions to thereby partially expose the conductors 8 inside, and then joining the exposed conductors 8 together. Next, a protective film 7 that is large enough to cover a region containing the exposed conductor portion 5 and the coating material end portions 1a to 3a and 1b adjacent to the exposed conductor portion 5, of the insulated wires 1 to 3 is prepared, and the wire bundle is placed on the protective film 7 such that the exposed conductor portion 5 is positioned at the center of the protective film 7. Then, the waterproofing agent 6 is supplied to the coating material end portions 1a to 3a and 1b adjacent to the exposed conductor portion 5, of the insulated wires 1 to 3.

Figure 3B:
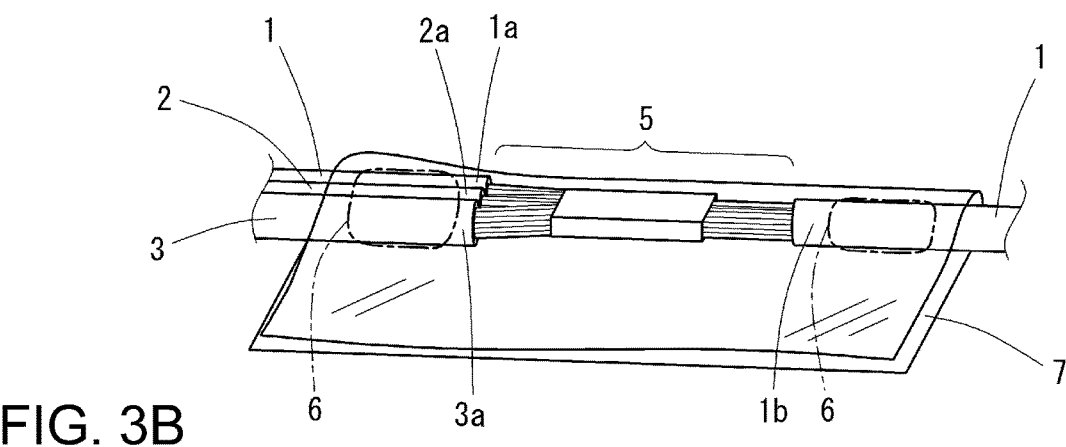

Next, as shown in FIG. 3(b), the protective film 7 that is spread out is folded in half. At this time, whether the gaps between adjacent insulated wires 1 and 2, 2 and 3, as well as 3 and 1 of the plurality of insulated wires 1 to 3 are sealed with the waterproofing agent 6 at the coating material end portions 1a to 3a adjacent to the exposed conductor portion 5 is confirmed visually or the like. A force is applied from outside the protective film 7, if necessary, so that the waterproofing agent 6 spreads through a desired region. If possible, adjustments are made so as to not allow the waterproofing agent 6 to flow to an outer peripheral surface of the exposed conductor portion 5. Since the waterproofing agent 6 is not supplied centered about the exposed conductor portion 5, the amount of waterproofing agent 6 flowing to the outer peripheral surface of the exposed conductor portion 5 can be reduced. Accordingly, penetration of the waterproofing agent 6 into the gaps between the strands 8a can be suppressed. The protective film 7 that is folded in half is then wrapped around the outer periphery of the waterproofing agent 6 and the like. If the protective film 7 has self-adhesive (pressure-sensitive adhesive) properties, the wrapped-around state is maintained due to the self-adhesive (pressure-sensitive adhesive) properties. Moreover, a hermetically sealed state is achieved due to the adhesive properties of overlapping portions of the film. Thus, the waterproofing agent 6 is kept inside the protective film 7.

Figure 3C:
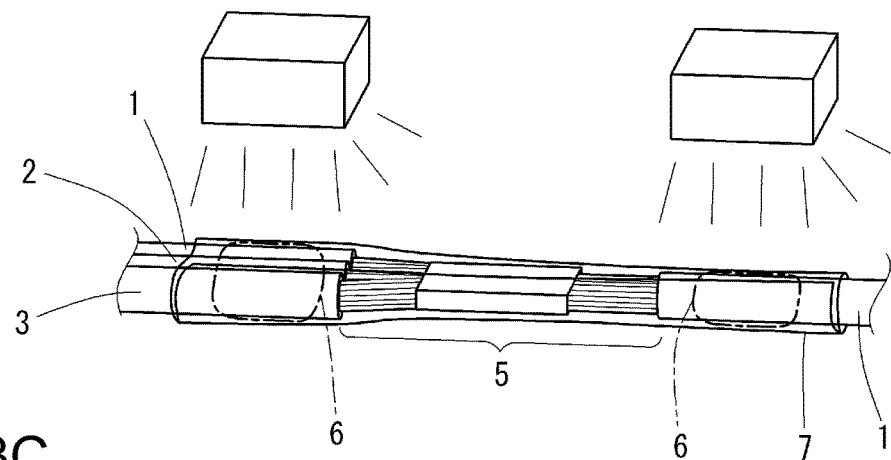

Next, as shown in FIG. 3(c), the waterproofing agent 6 is cured by irradiating the waterproofing agent 6 with light using a light irradiation apparatus such as an ultraviolet irradiation apparatus. Thus, the wire harness 10 is obtained.

With the wire harness 10 having the above-described configuration, the outer periphery of the region containing the exposed conductor portion 5 and the coating material end portions 1a to 3a and 1b adjacent to the exposed conductor portion 5, of the insulated wires 1 to 3 is continuously covered with the protective film 7, and the gaps between the coating materials 9 at the coating material end portions 1a to 3a and 1b and the protective film 7 covering the coating materials 9 are sealed with the waterproofing agent 6. Thus, the intrusion of water into the exposed conductor portion 5 from the gaps between the protective film 7 and the coating materials 9 and from outside the protective film 7 can be suppressed, and the waterproofing properties are ensured. In addition, at least one insulated wire of the plurality of insulated wires 1 to 3 has, in the gaps between the strands 8a constituting the conductor 8, a flow path through which gas flows, the flow path reaching from the coating material end portion opposite to the coating material end portion adjacent to the exposed conductor portion 5 to the splice portion 4. Thus, air inside the coating material 9 of this insulated wire has an escape route to the exposed conductor portion 5. Accordingly, even when this insulated wire is exposed to a high temperature, the air inside the coating material 9 flows to the exposed conductor portion 5, and loosening of a rubber stopper of a waterproofing terminal due to pressure applied by expanded air moving toward a connecting terminal opposite to the exposed conductor portion 5 can be suppressed.

Although an embodiment has been described in detail above, the invention is not limited to the foregoing embodiment, and various modifications can be made without departing from the gist of the invention.

For example, in the foregoing embodiment, the insulated wire 1, of the plurality of insulated wires 1 to 3 constituting the wire harness 10, is an insulated wire whose conductor 8 is partially exposed at the intermediate portion of the wire in the longitudinal direction, and the partially exposed conductor 8 is joined to the exposed conductors 8 of the other insulated wires 2 and 3 in the splice portion 4. That is to say, a waterproofing structure of an intermediate splice portion is obtained. However, the preferred embodiment may also be applied to a waterproofing structure of a so-called end splice portion, in which the conductor 8 of the above-described insulated wire 1 is also partially exposed at an end portion of the wire in its longitudinal direction.

Moreover, in the foregoing embodiment, a film-like protective material is used as the protective material that covers the outer periphery of the waterproofing agent 6. However, a tubular protective material (seamless member without seams in its circumferential direction) may also be used. In this case, the waterproofing agent 6 will be disposed inside the tubular protective material. Taking the ease of disposing the waterproofing agent 6 and the hermetic sealing ability into account, it is preferable to use a tubular member made of a resin with heat-shrinkability, for example, as the protective material.

Furthermore, in the foregoing embodiment, the production method is described using an example in which a photo-curable resin is used as the waterproofing agent 6. However, other curable resins and thermoplastic resins may also be used as the waterproofing agent 6. Also, in the production example illustrated in FIG. 3, the wire bundle is placed on the protective film 7 first. However, the waterproofing agent 6 may be supplied onto the protective film 7 first, and the wire bundle may be placed on the waterproofing agent 6 afterward.

EXAMPLES

Hereinafter, examples and comparative examples will be described.

Examples 1 to 5

Figure 5A:
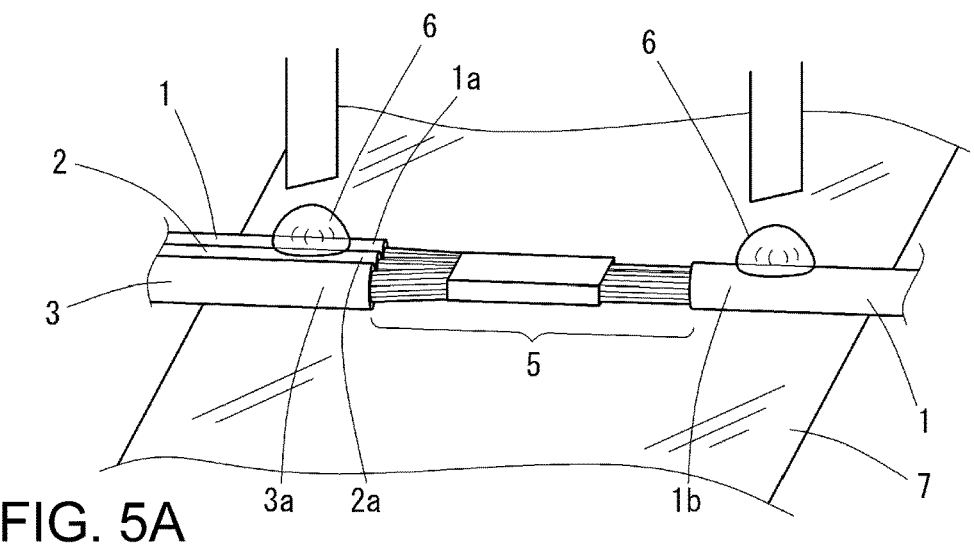
FIG. 5 shows explanatory diagrams illustrating methods for supplying a waterproofing agent according to examples and comparative examples.

An insulated wire 1 (outer diameter: 2.1 mm, length: 300 mm) with a coating material formed using a vinyl chloride resin, and insulated wires 2 and 3 (outer diameter: 2.1 mm, length: 150 mm) with a coating material formed using a vinyl chloride resin were prepared. A length of 20 mm of the coating material of the insulated wire 1 at a middle portion of the insulated wire 1 in the longitudinal direction was stripped, and a length of 15 mm of the coating materials of the insulated wires 2 and 3 at an end portion of the respective insulated wires 2 and 3 was stripped. The thus exposed conductors were bundled together, and joined together through ultrasonic welding to form an intermediate splice portion 4 (FIG. 5(a)). The wire bundle was placed on a transparent protective film 7 (70 mm×70 mm×10 μm) made of PVC such that the exposed conductor portion 5 including the intermediate splice portion 4 was at the center of the protective film 7 (FIG. 5(a)). Then, 0.3 g of a waterproofing agent 6 was supplied to each of the coating material end portions 1a to 3a and 1b adjacent to the exposed conductor portion 5 (FIG. 5(a)). Subsequently, the protective film 7 was folded in half and wrapped, and then, curing treatment was performed. Thus, a wire harness was produced.
  Protective film 7: "#244J" with pressure-sensitive adhesive properties, manufactured by DENKA
Curing Treatment
  Silicone resins and epoxy resins: Allowed to stand at room temperature for 8 hours or longer.
  Photo-curable resins: UV irradiation at 1 W/cm²×3 s was performed twice for the front side and the rear side.

Example 6

A wire harness was produced in the same manner as in Example 1 except that a film without pressure-sensitive adhesive properties ("Saran Wrap" (registered trademark) manufactured by Asahi Kasei Corporation) was used as the protective film 7, and a piece of pressure-sensitive adhesive tape made of PVC was wrapped around that film.

Comparative Examples 1 to 4

Figure 5B:
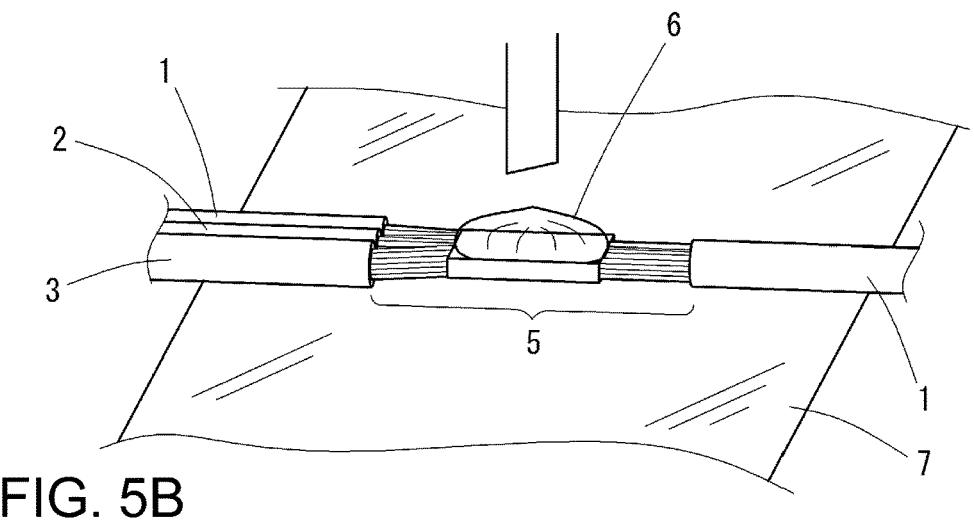

A wire harness was produced in the same manner as in Examples 1 to 4 except that, as shown in FIG. 5(b), 0.6 g of the waterproofing agent 6 was supplied centered about the intermediate splice portion 4 of the exposed conductor portion 5.

Comparative Examples 5 to 8

Figure 5C:
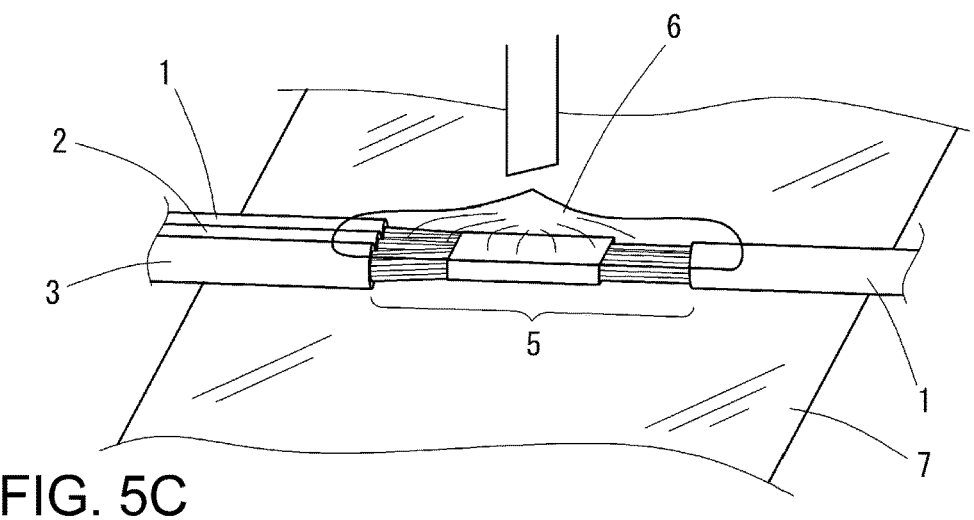
Figure 6A:
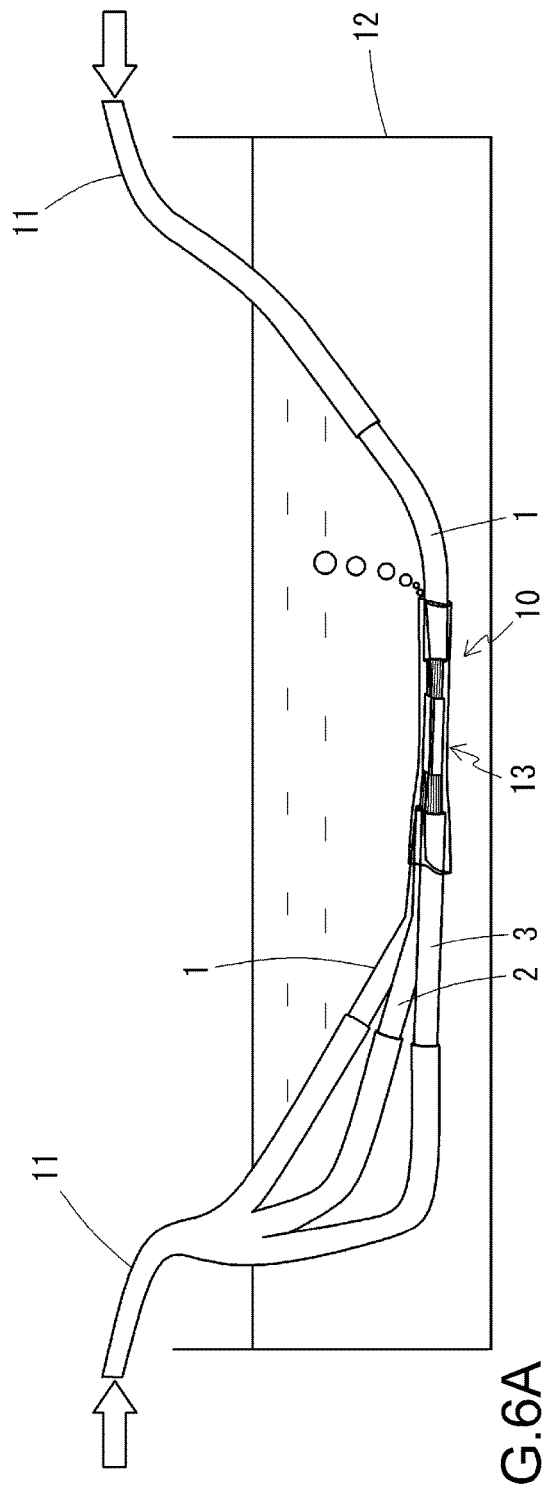
FIG. 6 shows explanatory diagrams illustrating a method for evaluating waterproofing properties and water-blocking properties.
Figure 6B:
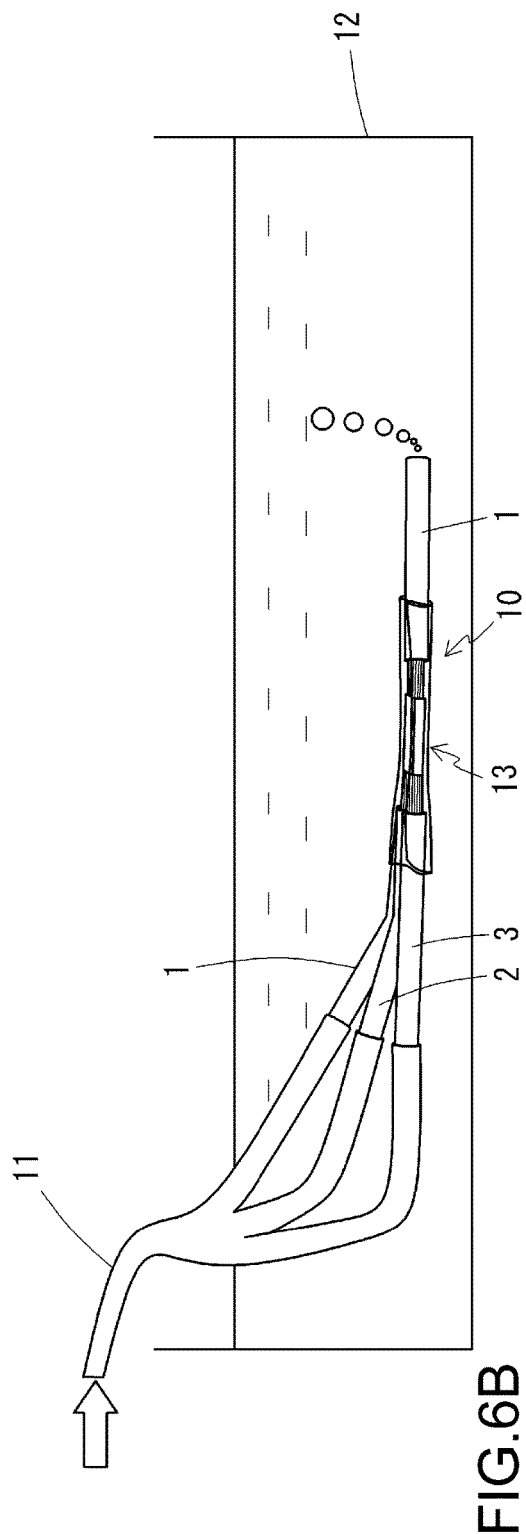

A wire harness was produced in the same manner as in Examples 1 to 4 except that, as shown in FIG. 5(c), 1.2 g of the waterproofing agent 6 was supplied centered about the intermediate splice portion 4 of the exposed conductor portion 5.
Waterproofing Agent
  Silicone resin 1: "KE3495" manufactured by Shin-Etsu Silicone; viscosity: 5.5 Pa·s (25° C.)
  Silicone resin 2: "KE3423" manufactured by Shin-Etsu Silicone; viscosity: 0.6 Pa·s (25° C.)
  Photo-curable resin 1 (UV-curable resin 1): "TB3017D" manufactured by ThreeBond; viscosity: 13 Pa·s (25° C.)
  Photo-curable resin 2 (UV-curable resin 2): "TB3177" manufactured by ThreeBond; viscosity: 1.2 Pa·s (25° C.)
  Epoxy resin (single-component type): "TB2202" manufactured by ThreeBond; viscosity: 13 Pa·s (25° C.)
Evaluation of Waterproofing Properties
  As shown in FIG. 6(a), rubber tubes 11 were inserted into end portions of the insulated wires 1 to 3 of each wire harness 10, and the entire wire harness 10 was placed in a water tank 12. In this state, 100 kPa of air pressure was applied from each of the rubber tubes 11 attached to opposite ends. If no air leaked from a waterproofing structure portion 13 while air pressure was applied for 30 seconds, the wire harness 10 was evaluated as acceptable (○), and if air leaked, the wire harness 10 was evaluated as not acceptable (x).
Evaluation of Water-Blocking Properties
  As shown in FIG. 6(b), with respect to the wire harnesses that were evaluated as acceptable in the evaluation of waterproofing properties, the rubber tube 11 at one end was removed, and 100 kPa of air pressure was applied from the rubber tube 11 on the other end side. The water-blocking properties were evaluated based on whether or not air leaked from the end of the insulated wire 1 without the rubber tube 11 while air pressure was applied for 30 seconds. The evaluation of water-blocking properties was performed as the evaluation of confirmation of flow paths. Twenty test pieces produced were tested. If it was confirmed that water was not blocked (air leaked, and flow paths through which gas flows were created in gaps between the strands constituting the conductors) in all of the twenty test pieces, the wire harness was evaluated as acceptable (○). If water was blocked in at least one of the twenty test pieces, the wire harness was evaluated as not acceptable. With respect to the wire harnesses that were evaluated as not acceptable, if water was blocked in one or two test pieces, the wire harness was evaluated as poor (Δ), and if water was blocked in three or more test pieces, the wire harness was evaluated as bad (x).

TABLE 1

| | Examples | | | | | |
|---|---|---|---|---|---|---|
| | 1 | 2 | 3 | 4 | 5 | 6 |
| Waterproofing agent | 0.3 g to each of opposite ends | | | | | |
| Silicone resin 1 (parts by mass) | 100 | 100 | — | — | — | — |
| Silicone resin 2 (parts by mass) | — | — | 100 | — | — | — |
| Photo-curable resin 1 (parts by mass) | — | — | — | 100 | — | — |
| Photo-curable resin 2 (parts by mass) | — | — | — | — | 100 | — |
| Epoxy resin (parts by mass) | — | — | — | — | — | 100 |
| Protective film (with pressure-sensitive adhesive properties) | Applied | Applied | Applied | Applied | Applied | — |
| Protective film (without pressure-sensitive adhesive properties) + Tape | — | — | — | — | — | Applied |
| Penetration time (s) | 10 | 30 | 10 | 30 | 10 | 30 |
| Waterproofing properties | ○ | ○ | ○ | ○ | ○ | ○ |
| Water-blocking properties (properties of not blocking water) | ○ | ○ | ○ | ○ | ○ | ○ |
| Protrusion of resin | ○ | ○ | ○ | ○ | ○ | ○ |

TABLE 2

| | Comparative Examples | | | | | | | |
|---|---|---|---|---|---|---|---|---|
| | 1 | 2 | 3 | 4 | 5 | 6 | 7 | 8 |
| Waterproofing agent | 0.6 g to exposed conductor portion | | | | 1.2 g to exposed conductor portion | | | |
| Silicone resin 1 (parts by mass) | 100 | — | — | — | 100 | — | — | — |
| Silicone resin 2 (parts by mass) | — | 100 | — | — | — | 100 | — | — |
| Photo-curable resin 1 (parts by mass) | — | — | 100 | — | — | — | 100 | — |
| Photo-curable resin 2 (parts by mass) | — | — | — | 100 | — | — | — | 100 |
| Epoxy resin (parts by mass) | — | — | — | — | — | — | — | — |
| Protective film (with pressure-sensitive adhesive properties) | Applied | Applied | Applied | Applied | Applied | Applied | Applied | Applied |
| Protective film (without pressure-sensitive adhesive properties) + Tape | — | — | — | — | — | — | — | — |
| Penetration time (s) | 30 | 10 | 30 | 10 | 10 | 10 | 10 | 10 |
| Waterproofing properties | x | ○ | x | ○ | — | — | — | — |
| Water-blocking properties (properties of not blocking water) | — | Δ | — | Δ | — | — | — | — |
| Protrusion of resin | ○ | ○ | ○ | ○ | x | x | x | x |

In Comparative Examples 1 to 8, the waterproofing agent 6 was supplied centered about the intermediate splice portion 4 of the exposed conductor portion 5. Among these comparative examples, in Comparative Examples 1 to 4, the amount of waterproofing agent 6 supplied was small, and in the cases where a high-viscosity resin was used as the waterproofing agent 6 (Comparative Examples 1 and 3), the waterproofing agent 6 did not sufficiently spread to the coating material end portions 1a to 3a and 1b adjacent to the exposed conductor portion 5, and satisfactory waterproofing properties were not achieved. In the cases where a low-viscosity resin was used as the waterproofing agent 6 (Comparative Examples 2 and 4), even though the waterproofing agent 6 sufficiently spread to the coating material end portions 1a to 3a and 1b adjacent to the exposed conductor portion 5, in some test pieces, the waterproofing agent 6 penetrated into gaps between the strands while spreading due to its low viscosity, and thus flow paths through which gas flows were not secured in the gaps between the strands. On the other hand, in Comparative Examples 5 to 8, a large amount of waterproofing agent 6 was supplied. Thus, the waterproofing agent 6 protruded from the protective film 7, and none of the produced wire harnesses were worth testing for waterproofing properties and the like. As described above, with the comparative examples in which the waterproofing agent 6 was supplied centered about the intermediate splice portion 4 of the exposed conductor portion 5, it was difficult to make adjustments so as to reliably waterproof the coating material end portions 1a to 3a and 1b adjacent to the exposed conductor portion 5, and there were concerns of insufficient waterproofing.

In contrast, in the examples, the waterproofing agent 6 was supplied to the coating material end portions 1a to 3a and 1b adjacent to the exposed conductor portion 5, and therefore, the waterproofing agent 6 was kept from flowing into the gaps between the strands, and sufficient flow paths through which gas flows were secured in the gaps between the strands while ensuring the waterproofing properties. Accordingly, if the wire harness of any of the examples is used, even when one of the insulated wires constituting the wire harness is exposed to a high temperature, air inside the coating material flows to the exposed conductor portion and the other insulated wires, and loosening of a rubber stopper of a waterproofing terminal due to pressure applied by expanded air moving toward a connecting terminal opposite to the exposed conductor portion can be suppressed. Moreover, even when a waterproofing agent 6 of a different type or with a different degree of viscosity is used, the waterproofing properties and the flow paths can be secured as well. That is to say, it is easy to make adjustments so as to reliably waterproof the coating material end portions 1a to 3a and 1b adjacent to the exposed conductor portion 5.

Although embodiments have been described in detail above, the invention is not limited to the foregoing embodiments, and various modifications can be made without departing from the gist of the invention.

LIST OF REFERENCE NUMERALS

10 Wire harness
1 to 3 Insulated wire
4 Splice portion
5 Exposed conductor portion
6 Waterproofing agent
7 Protective film
8 Conductor
8a Strand
9 Coating material

The invention claimed is:

1. A wire harness comprising:
an exposed conductor portion including a splice portion, a bundle of partially exposed conductors of a plurality of insulated wires being joined together at the splice portion;
a film-like or tubular protective material continuously covering an outer periphery of a region containing the exposed conductor portion and a plurality of coating material end portions adjacent to the exposed conductor portion; and
a waterproofing agent sealing a gap at each of the plurality of coating material end portions, each gap being between one of the plurality of coating material end portions and the film-like or tubular protective material that the one of the plurality of coating material end portions is sealed with,
wherein at least one insulated wire of the plurality of insulated wires has a sealed flow path configured to allow gas to flow, the sealed flow path being created in gaps between a plurality of strands of the insulated wire and extending from a first coating material end portion of the plurality of coating material end portions to a second coating material end portion of the plurality of coating material end portions, the first coating material end portion and the second coating material end portion being disposed on opposite sides of the splice portion.

2. The wire harness according to claim 1, wherein the exposed conductor portion is provided with a portion where the waterproofing agent is partially not disposed between the exposed conductor portion and the film-like or tubular protective material covering the exposed conductor portion.

3. The wire harness according to claim 2, wherein at least one first insulated wire of the plurality of insulated wires includes a conductor that is partially exposed at an intermediate portion of the at least one first insulated wire in a longitudinal direction, the at least one first insulated wire being joined to an exposed conductor of a second insulated wire in the splice portion, the at least one first insulated wire having a sealed flow path through which gas flows, the sealed flow path being disposed in gaps between strands forming the conductor and reaching from a first end of the at least one first insulated wire to a second end of the at least one first insulated wire in the longitudinal direction.

4. The wire harness according to claim 3, wherein the at least one first insulated wire of the plurality of insulated wires includes two or more first insulated wires.

5. The wire harness according to claim 4, wherein the waterproofing agent is formed of a cured product of a curable resin.

6. The wire harness according to claim 1, wherein:
the waterproofing agent is only in contact with a coating material of the plurality of coating material end portions and the film-like or tubular protective material such that the at least one insulated wire of the plurality of insulated wires has a sealed flow path configured to allow gas to flow, and
the sealed flow path extends within the film-like or tubular protective material and extends past the splice portion.

* * * * *